(12) United States Patent
Hu et al.

(10) Patent No.: US 11,156,563 B2
(45) Date of Patent: Oct. 26, 2021

(54) ELECTRONIC DEVICE FOR OPTICALLY CHECKING APPEARANCE OF PRODUCT FOR DEFECTS

(71) Applicant: Fu Tai Hua Industry (Shenzhen) Co., Ltd., Shenzhen (CN)

(72) Inventors: Liu-Bin Hu, Shenzhen (CN); Bin Zou, Shenzhen (CN); Zhi-Cheng Huang, Shenzhen (CN)

(73) Assignee: Fu Tai Hua Industry (Shenzhen) Co., Ltd., Shenzhen (CN)

(*) Notice: Subject to any disclaimer, the term of this patent is extended or adjusted under 35 U.S.C. 154(b) by 3 days.

(21) Appl. No.: 16/862,211

(22) Filed: Apr. 29, 2020

(65) Prior Publication Data

US 2021/0109031 A1    Apr. 15, 2021

(30) Foreign Application Priority Data

Oct. 14, 2019   (CN) .......................... 201910973548.7

(51) Int. Cl.
*G01N 21/88*      (2006.01)
*G06T 7/00*       (2017.01)

(52) U.S. Cl.
CPC ..... *G01N 21/8851* (2013.01); *G01N 21/8806* (2013.01); *G06T 7/0004* (2013.01); *G01N 2021/887* (2013.01); *G01N 2021/8887* (2013.01)

(58) Field of Classification Search
CPC .......... G01N 21/8851; G01N 21/8806; G01N 2021/887; G01N 2021/8887; G06T 7/0004

See application file for complete search history.

(56) References Cited

U.S. PATENT DOCUMENTS

2018/0045652 A1* 2/2018 Umehara ........... G01N 21/8806

* cited by examiner

*Primary Examiner* — Jamil Ahmed
(74) *Attorney, Agent, or Firm* — ScienBiziP, P.C.

(57) ABSTRACT

An electronic device for optically checking an appearance of products for defects includes a camera device, at least one white light source, and at least one red light source. The camera device is perpendicular to a side surface of a product to be checked, when the white light source is activated, the camera device captures images of the side surface and corners of the side surface of the product. When the red light source is activated, the camera device captures images of the side surface of the product. The electronic device checks for defects in appearance of the side surface of the product according to the images captured by the camera device, such defects including abnormal colors, stair slope errors, scratches, and sanding marks.

11 Claims, 11 Drawing Sheets

ELECTRONIC DEVICE FOR OPTICALLY CHECKING APPEARANCE OF PRODUCT FOR DEFECTS

CROSS-REFERENCE TO RELATED APPLICATIONS

This application claims priority to Chinese Patent Application No. 201910973548.7 filed on Oct. 14, 2019, the contents of which are incorporated by reference herein.

FIELD

The subject matter herein generally relates to manufacturing, and particularly to an electronic device for optically checking an appearance of a product for defects.

BACKGROUND

In the industrial production process, appearance checking is important. Wear, scratches, errors, and improper operation can easily cause damage to the appearance of products, and defects such as abnormal colors, stair slope errors, scratches, and sanding marks on side surfaces of the products can occur. Appearance checking is an essential procedure in manufacturing.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "comprising" means "including, but not necessarily limited to"; it specifically indicates open-ended inclusion or membership in a so-described combination, group, series, and the like.

Figure 1:
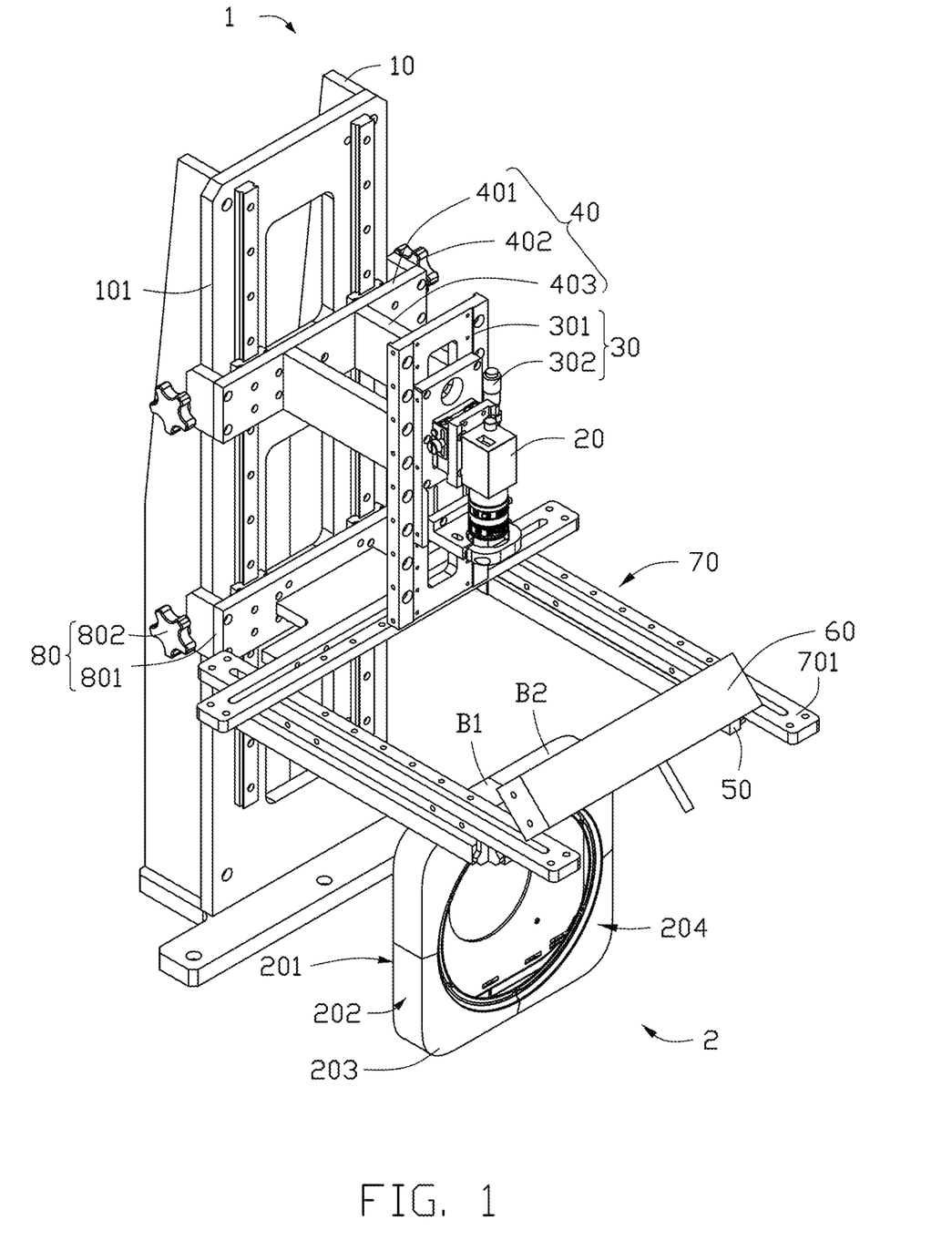
FIG. 1 is a schematic view of a first embodiment of an electronic device.

FIG. 1 illustrates an electronic device 1 in a first embodiment. The electronic device 1 checks an appearance on a side of a product 2, by capturing and analyzing images of sides and corners of the product 2. Defects such as abnormal colors, stair slope errors, scratches, and sanding marks may thus be revealed. In the first embodiment, the product 2 can be a casing of a terminal device such as a router, a modem, or a TV box.

The abnormal colors on the sides of the product 2 can generally be light gray, the distribution is irregular and sheet. The stair slope errors on the sides of the product 2 are generally located at the edge position and usually highlighted in color. The scratches on the sides of the product 2 are generally in a form of highlight points.

In the first embodiment, the abnormal colors can have a length range of 20 mm-190 mm and a width range of 3 mm-30 mm, the stair slope errors can have a length range of 2 mm-40 mm, and the scratches can have a diameter range of 0.01 mm-0.03 mm, these defects may be revealed by capturing and analyzing the images of the sides and corners of the product 2.

Figure 2:
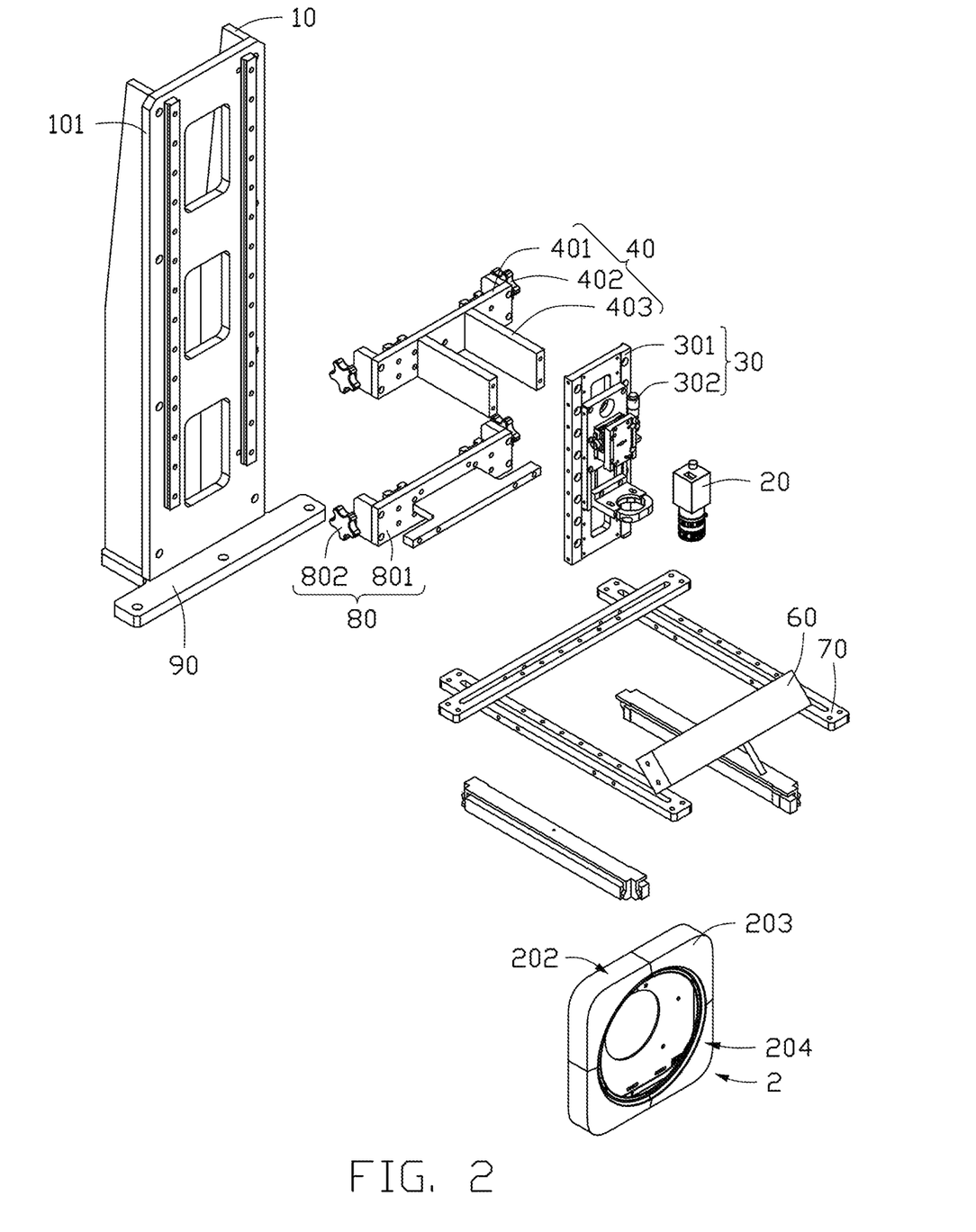
FIG. 2 is an exploded view of the electronic device in FIG. 1.

Referring to FIGS. 1 and 2, the electronic device 1 includes, but is not limited to, a bracket 10, a camera device 20, a camera bracket 30, a camera adjustment bracket 40, at least one white light source 50, at least one red light source 60, a light source bracket 70, a light source adjustment bracket 80, and a base 90. In the first embodiment, the camera bracket 30 and the light source bracket 70 are arranged on the bracket 10. The camera device 20 is arranged on the camera bracket 30, the white light source 50 and the red light source 60 are arranged on the light source bracket 70, and the base 90 is fixedly connected to an end of the bracket 10.

In the first embodiment, the camera device 20 can be an industrial camera with five-megapixel, and a fixed-focus industrial lens with a focal length range of 15-17 mm. The focal length of the camera device 20 can be calculated by an equation f=lens magnification*WD. WD is a working distance of the camera device 20. A range of exposure time of the camera device 20 is 4400-4800 μs.

The electronic device 1 further includes two white light sources 50 and a red light source 60. The white light sources 50 and the red light source 60 are bar-shaped light sources, and extension directions of the white light sources 50 and the red light source 60 are in parallel with the side surface of the product 2. In at least one embodiment, a brightness range of the white light sources 50 and the red light source 60 is 6500-7600 lm.

In at least one embodiment, the product 2 further includes a plane 201, three side surfaces 202, four corners 203, and a 3D surface 204. When the product 2 is placed on the electronic device 1, a side surface 202 faces the camera device 20. When the white light sources 50 are activated, the camera device 20 captures images of the side surfaces 202 and the corners 203. When the red light source 60 is activated, the camera device 20 captures images of the side surfaces 202. The side surfaces 202 are checked according to the images captured by the camera device 20.

Figure 3:
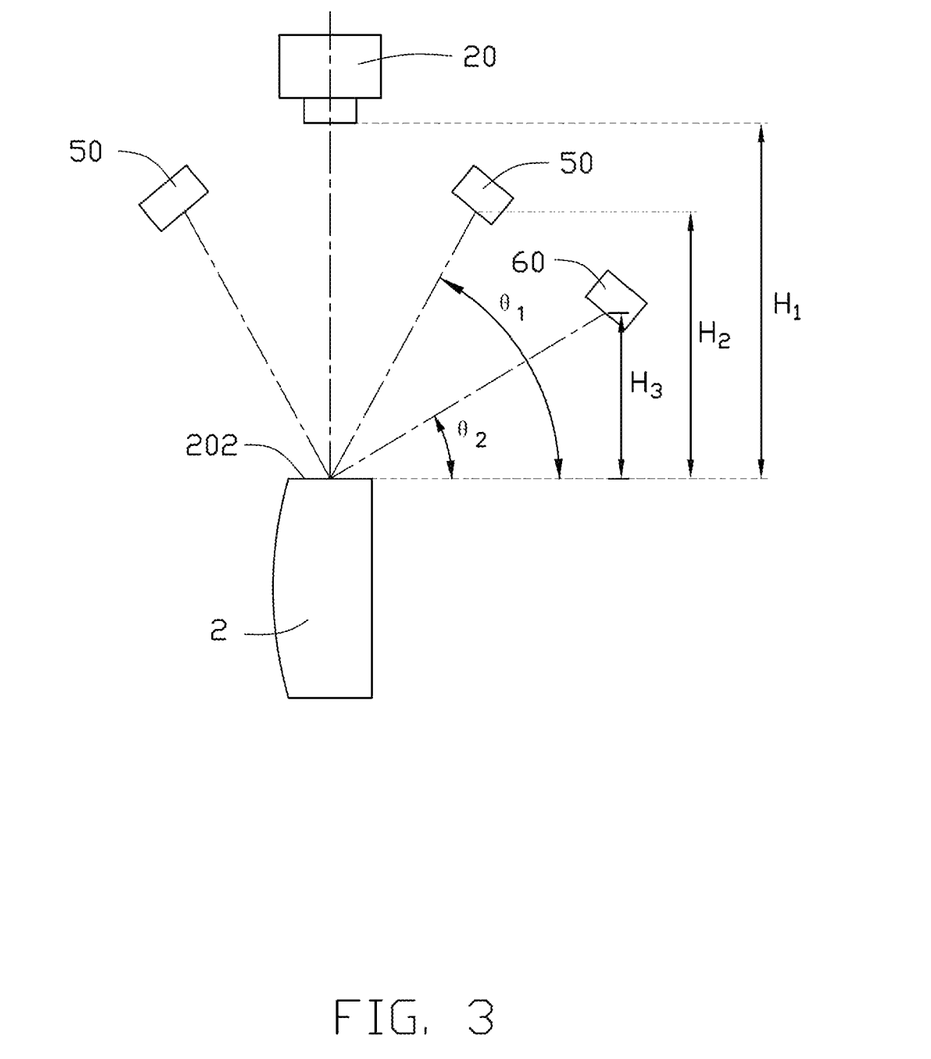
FIG. 3 is a schematic view of a first embodiment of the component layout of the electronic device of FIG. 1.

Referring to FIG. 3, in at least one embodiment, the camera device 20 is perpendicular to the side surface 202, and a distance between the camera device 20 and the side surface 202 is a first preset distance H1. A distance between the white light source 50 and the side surface 202 is a second preset distance H2. An angle between the white light source 50 and the side surface 202 is a first preset angle $\theta1$. A distance between the red light source 60 and the side surface 202 is a third preset distance H3. An angle between the red light source 60 and the side surface 202 is a second preset angle $\theta2$. In at least one embodiment, the first preset distance $H1=x*[(a+b)/2]$, the second preset distance $H2=y*[(a+b)/2]$, and the third preset distance $H3=z*[(a+b)/2]$. Therein a is a length of the product 2, b is a width of the product 2, and c is a height of the product 2, therein $1.3<x<1.6$, $0.3<y<0.6$, $0.6<z<0.8$, $30°<\theta1<70°$, $20°<\theta2<60°$.

As illustrated in FIGS. 1 and 2, in at least one embodiment, the bracket 10 includes two slide rails 101. The camera adjustment bracket 40 includes a first sliding portion 401, a first locking portion 402, and a connection portion 403. Ends of the first sliding portion 401 are sleeved on the slide rail 101, and one end is engaged with the first locking portion 402. The first locking portion 402 locks the first sliding portion 401. The connection portion 403 is fixedly connected to the first sliding portion 401 and the camera bracket 30. The camera bracket 30 includes a fixing portion 301 and a fine adjustment portion 302. The fixing portion 301 fixes the camera device 20, and the fine adjustment portion 302 precisely adjusts the position of the camera device 20. When the first locking portion 402 is rotated by an external force, the first sliding portion 401 is driven by the first locking portion 402 to slide up and down along the slide rail 101, the position of the camera device 20 is thus adjusted. The fine adjustment portion 302 is further driven to adjust the position of the camera device 20 and keep the distance between the camera device 20 and the side surface 202 at the first preset distance H1.

In at least one embodiment, the light source adjustment bracket 80 includes a second sliding portion 801 and a second locking portion 802. Ends of the second sliding portion 801 are sleeved on the slide rail 101, and one end is engaged with the second locking portion 802. The light source bracket 70 includes two supporting portions 701 arranged on the second sliding portion 801. The white light sources 50 are arranged on the supporting portions 701. The red light source 60 is arranged on the two supporting portions 701.

When the second locking portion 802 is driven to rotate by an external force, the second sliding portion 801 is driven by the second locking portion 802 to slide up and down along the slide rail 101, a position of the white light source 50 is thus adjusted. The distance between the white light source 50 and the side surface 202 can be the second preset distance H2, and the angle between the white light source 50 and the side surface 202 can be the first preset angle $\theta1$. At the same time, a position of the red light source 60 is also adjusted, a distance between the red light source 60 and the side surface 202 can be the third preset distance H3, and an angle between the red light source 60 and the side surface 202 can be the second preset angle $\eta2$.

Figure 4:
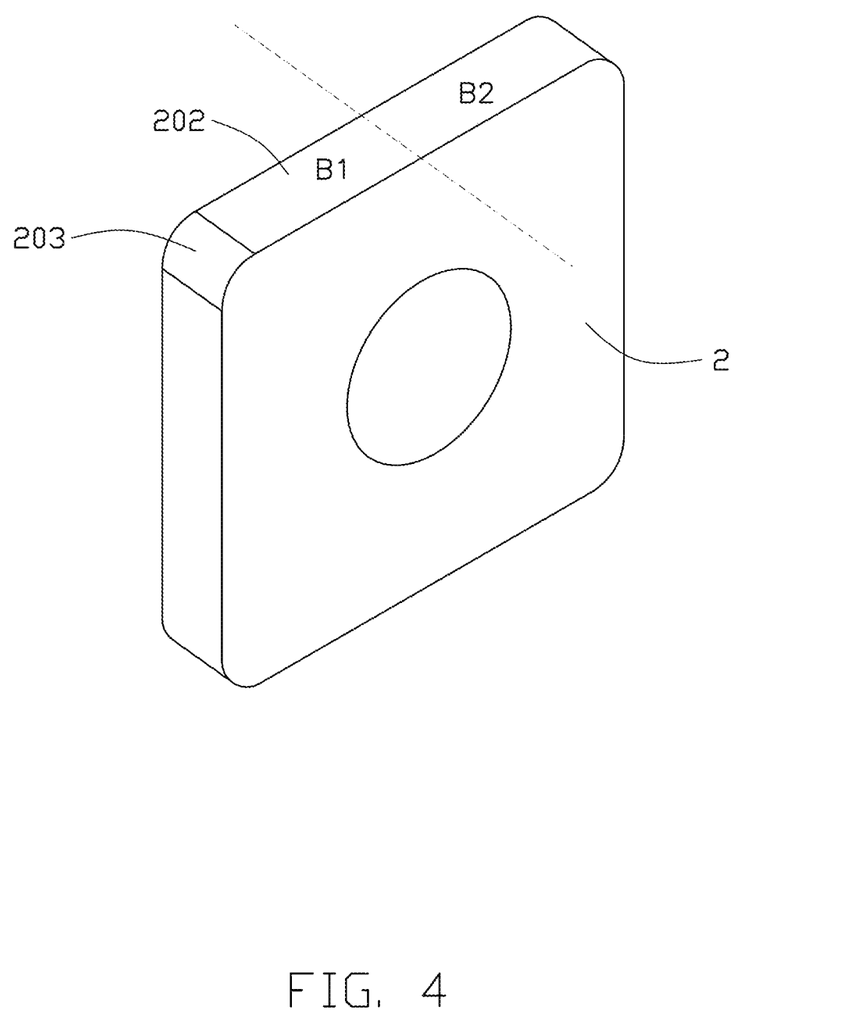
FIG. 4 is a schematic view of a first embodiment of a product to be checked by the electronic device of FIG. 1.

Referring to FIG. 4, in at least one embodiment, the side surface 202 includes two checking areas B1 and B2. When the white light sources 50 are activated, the camera device 20 captures an image of each checking area of the side surface 202, and an image of each corner 203 of the side surface 202, for checking defects such as abnormal colors, stair slope errors, and scratches on the side surface 202. When the red light source 60 is activated, the camera device 20 further captures an image of each checking area of the side surface 202, for checking defects such as sanding marks on the side surface 202.

Figure 5:
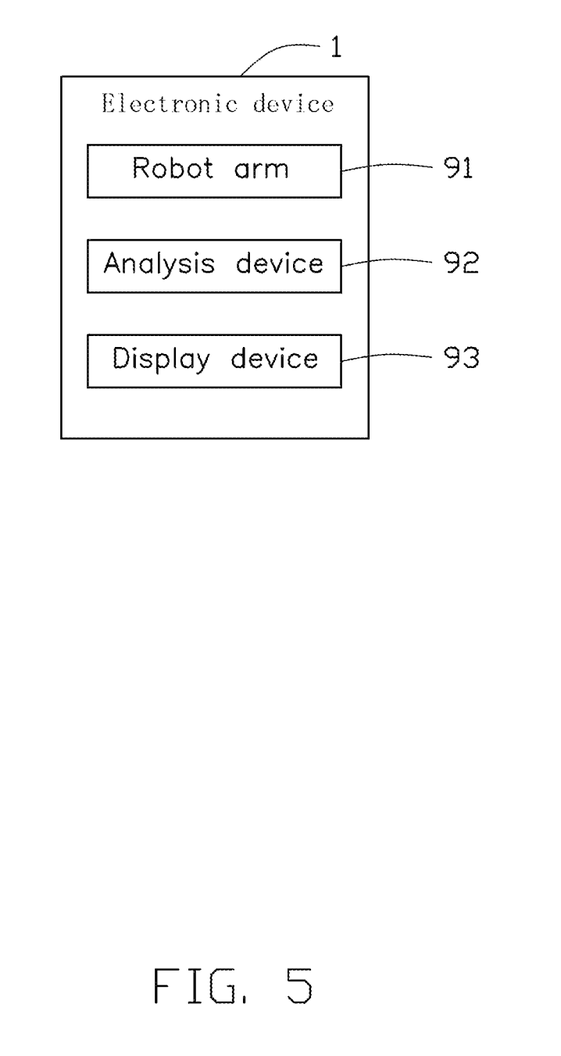
FIG. 5 is a block view of a first embodiment of the electronic device of FIG. 1.

Referring to FIG. 5, the electronic device 1 further includes a robot arm 91. When the camera device 20 captures an image of the side surface 202, the robot arm 91 controls the product 2 to move left and right, so that each checking area of the side surface 202 enters a capturing range of the camera device 20. After the camera device 20 captures two checking areas of the side surface 202, the robot arm 91 controls the product 2 to rotate 45 degrees, so that the corner 203 enters the capturing range of the camera device 20. After the camera device 20 captures images of the corner 203, the robot arm 91 further controls the product 2 to rotate 45 degrees, so that other side surface 202 of the product 2 enters the capturing range of the camera device 20. When the white light source 50 is activated, the camera device 20 captures six images of the side surface 202 and four images of the corners 203. When the red light source 60 is activated, the camera device 20 captures six images of the side surface 202, thus a total of sixteen images are captured by the camera device 20.

Figure 6:
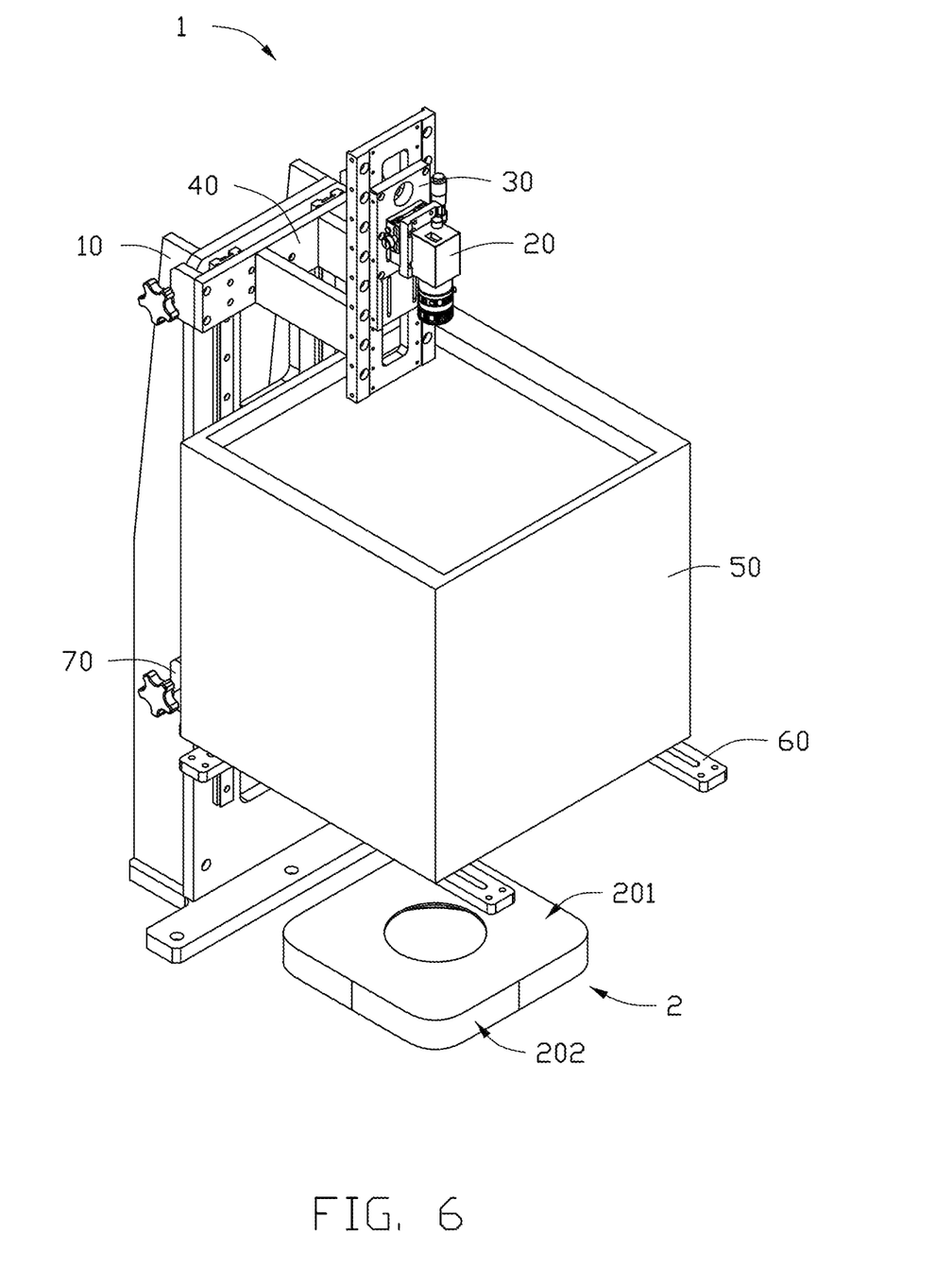
FIG. 6 is a schematic view of a second embodiment of an electronic device.

Referring to FIG. 6, in a second embodiment, the electronic device 1 further includes a coaxial light source 61. The coaxial light source 61 is arranged on the light source bracket 70. When the coaxial light source 61 is activated, the camera device 20 captures images of the plane 201 and the side surface 202 of the product 2 for checking for defects of the plane 201 and the side surface 202.

In the second embodiment, when the camera device 20 is used to check for defects of the plane 201 and the side surface 202 of the product 2, the camera device 20 is an industrial camera with 12 million pixels, and is equipped with a fixed-focus industrial lens with a focal length range of 23-27 mm and a depth of 6 mm. The color temperature range of the coaxial light source 61 is 5000-6000K.

Figure 7:
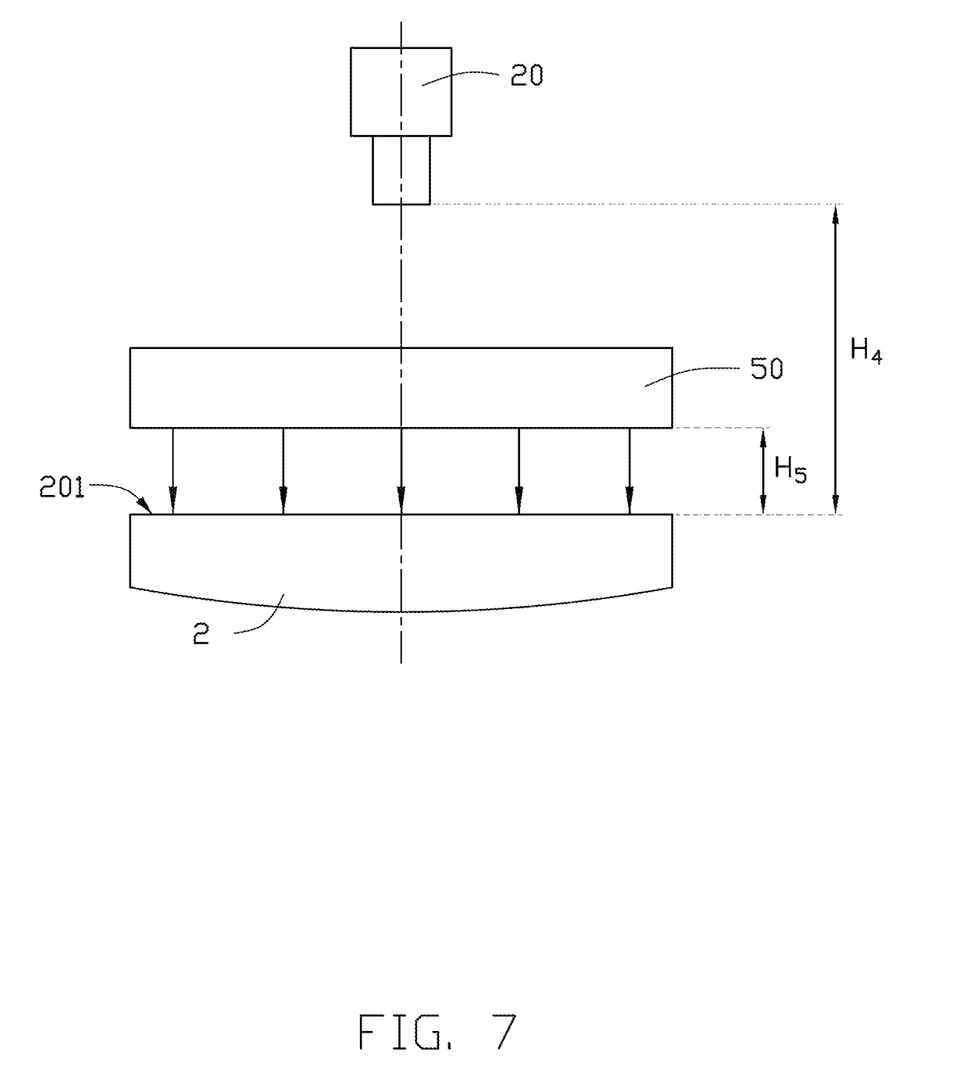
FIG. 7 is a schematic view of a second embodiment of the component layout of the electronic device of FIG. 6.

Referring to FIG. 7, when the plane 201 and the side surface 202 of the product 2 are checked, the camera device 20 and the coaxial light source 61 are perpendicular to the plane 201 of the product 2, the distance between the camera device 20 and the plane 201 is a fourth preset distance H4, and the distance between the coaxial light source 61 and the plane 201 is a fifth preset distance H5.

In the second embodiment, when the length of the product 2 is a, the width of the product 2 is b, and the height of the product 2 is c, the fourth preset distance $H4=m*[(a+b)/2]$, the fifth preset distance $H5=n*[(a+b)/2]$, therein $2.1<m<2.5$, $0.3<n<0.4$.

Figure 8:
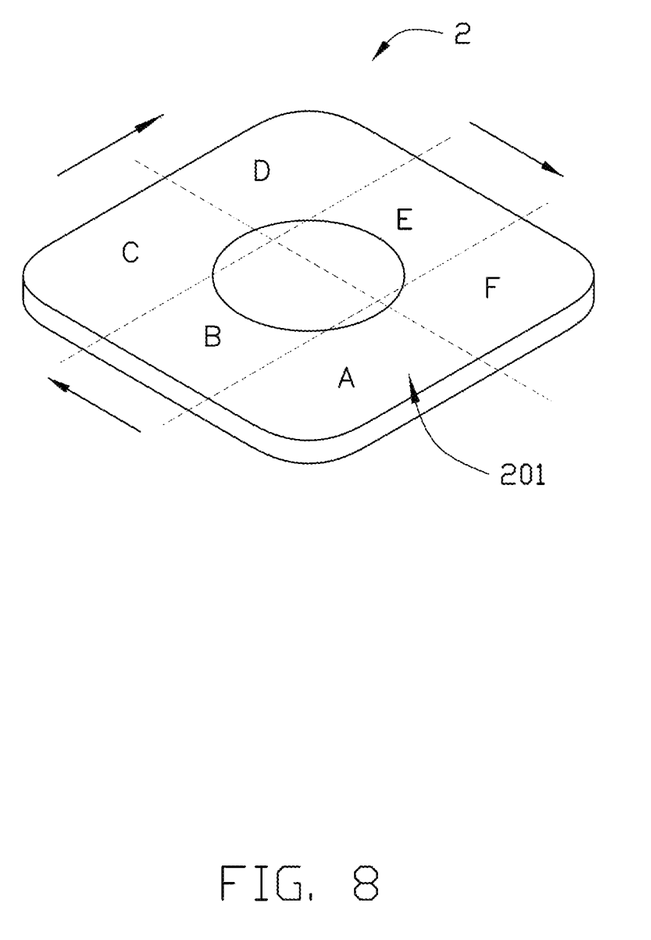
FIG. 8 is a schematic view of a second embodiment of a product to be checked by the electronic device of FIG. 6.

Referring to FIGS. 7 and 8, in the second embodiment, the plane 201 includes six checking areas, each side surface 202 includes two checking areas. When the coaxial light source 61 is activated, the camera device 20 captures an image of each checking area of plane 201 and the side surface 202.

When the camera device 20 captures an image of the plane 201, the robot arm 91 controls the product 2 to perform a matrix-type movement, so that all of the checking area on the plane 201 can enter the capturing range of the camera device 20 in order. When the camera device 20 captures an image of the side surface 202, the robot arm 91 controls the product 2 to move left and right in the vertical direction, thus the checking areas are switched into the capturing range of the camera device 20.

In an initial state, a checking area A of the plane 201 is within the capturing range of the camera device 20, the coaxial light source 61 is activated, and the camera device 20 captures an image of the checking area A. Then, the robot arm 91 controls the product 2 to perform a matrix-type movement, so that checking areas B-F are driven to enter the capturing range of the camera device 20 in order. The camera device 20 captures six images of the plane 201.

As illustrated in FIG. 4, the robot arm 91 controls the product 2 to rotate 90 degrees, so that the checking area B1 of the side surface 202 is within the capturing range of the camera device 20, and images of the checking area B1 is captured by the camera device 20. Then the robot arm 91 controls the product 2 to move until the checking area B2 is within the capturing range of the camera device 20. Then, the robot arm 91 controls the product 2 to rotate 90 degrees again and repeats the above actions, so as to capture images of two checking areas of each side surface 202. The camera device 20 captures six images of the side surface 202 in this way. At this time, defects such as dripping acid, dirt, corrosion points, uneven dyeing, white spots, material discoloration, and watermarks on the plane 201 and the side surface 202 are revealed by the camera device 20.

Figure 9:
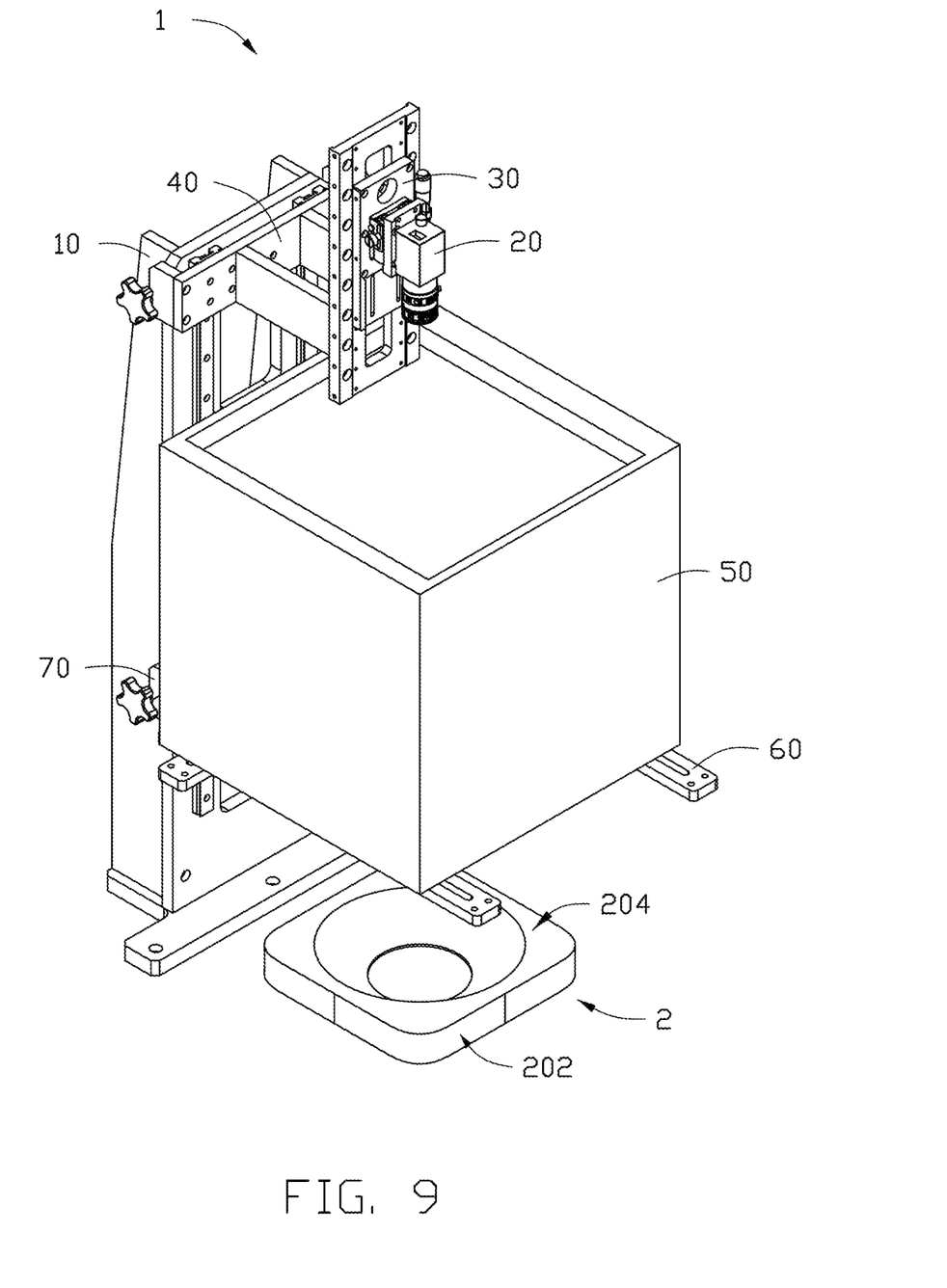
FIG. 9 is a schematic view of a third embodiment of an electronic device.

Referring to FIG. 9, in a third embodiment, when the camera device 20 is used to check for defects of the 3D surface 204 of the product 2, the camera device 20 is an industrial camera with 12 million pixels, and is equipped with a fixed-focus industrial lens with a focal length range of 33-37 mm and a depth of 4 mm. The color temperature range of the coaxial light source 61 is 5000-6000K.

Figure 10:
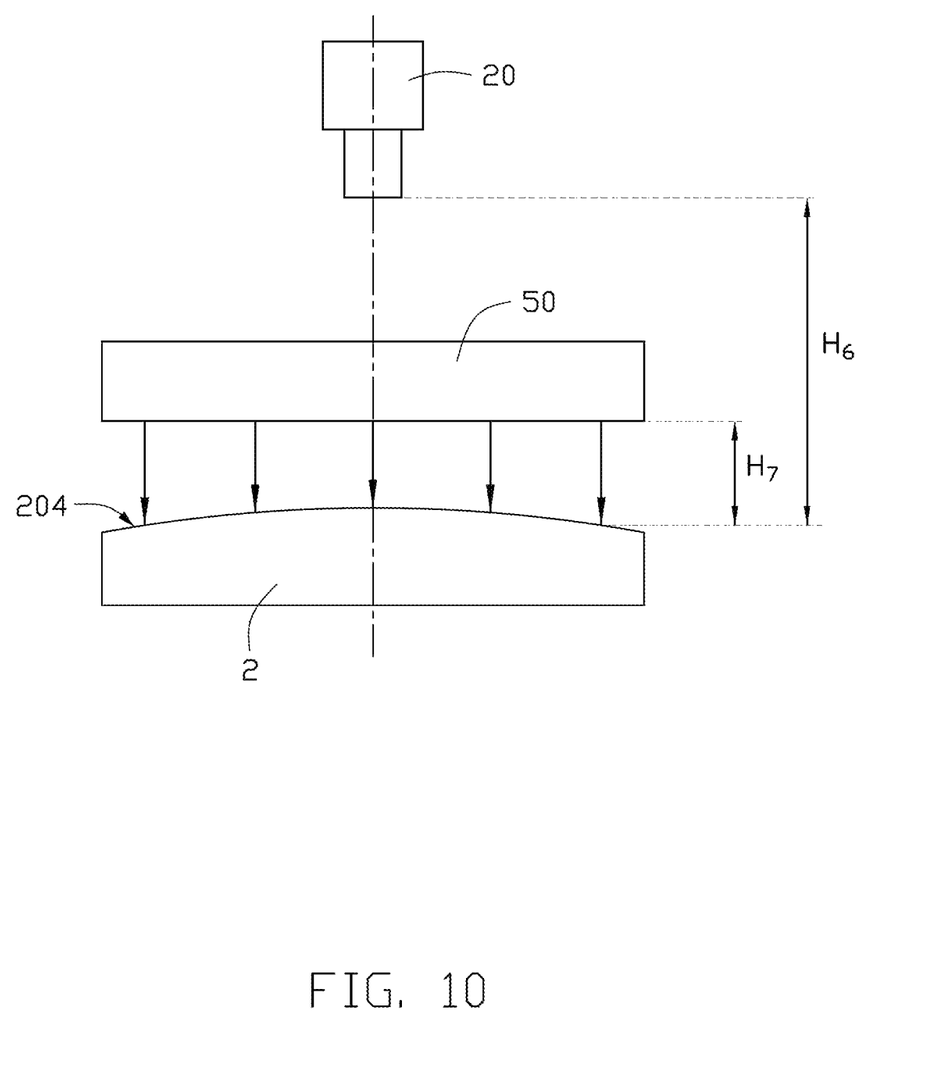
FIG. 10 is a schematic view of a third embodiment of the component layout of the electronic device of FIG. 9.

Referring to FIG. 10, when the 3D surface 204 of the product 2 is checked, the camera device 20 and the coaxial light source 61 are perpendicular to a normal tangent plane of the 3D surface 204 of the product 2, the distance between the camera device 20 and the 3D surface 204 is a sixth preset distance H6, and the distance between the coaxial light source 61 and the 3D surface 204 is a seventh preset distance H7.

In the third embodiment, when the length of the product 2 is a, the width of the product 2 is b, and the height of the product 2 is c, the sixth preset distance $H6=i*[(a+b)/2]$, and the seventh preset distance $H7=j*[(a+b)/2]$, therein $1.8<i<2.2$, $0.1<j<0.2$.

Figure 11:
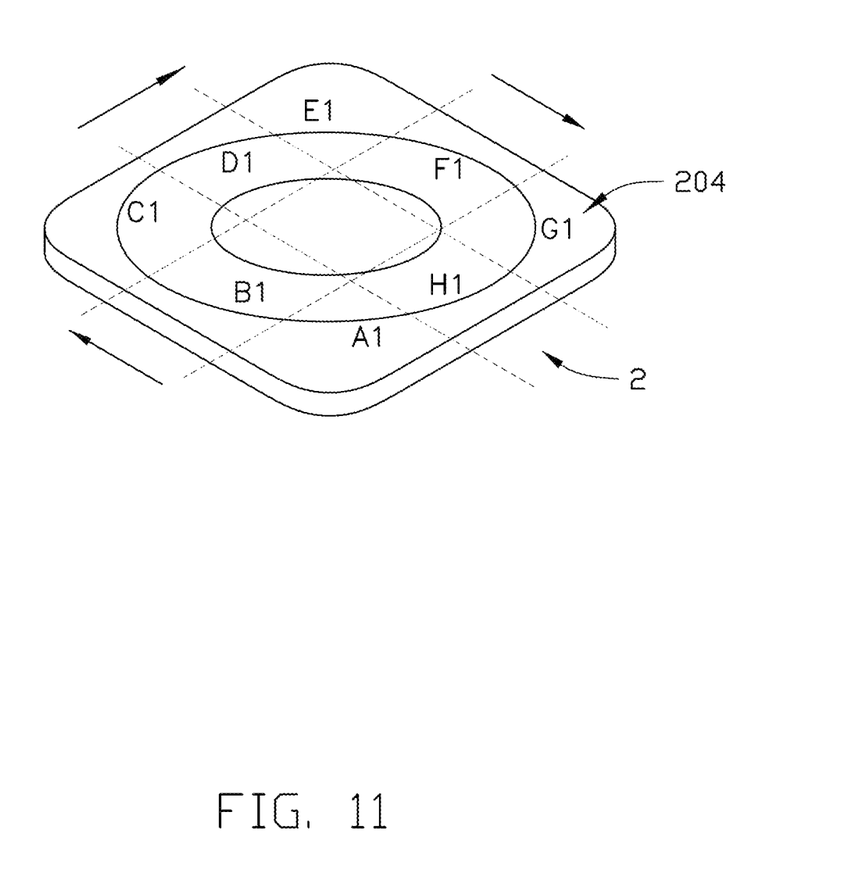
FIG. 11 is a schematic view of a third embodiment of a product to be checked by the electronic device of FIG. 9.

Referring to FIG. 11, in the third embodiment, the 3D surface 204 includes eight checking areas. When the coaxial light source 61 is activated, the camera device 20 captures an image of each checking area of the 3D surface 204.

When the camera device 20 captures an image of the 3D surface 204, the robot arm 91 controls the product 2 to perform a matrix-type movement, so that all of the checking areas can enter the capturing range of the camera device 20 in order.

In an initial state, a checking area A1 of the 3D surface 204 is within the capturing range of the camera device 20, the coaxial light source 61 is turned on, and the camera device 20 captures an image of the checking area A1. Then, the robot arm 91 controls the product 2 to clockwise perform a matrix-type movement, so that checking areas B1-H1 are driven to enter the capturing range of the camera device 20 in order. The camera device 20 captures eight images of the 3D surface 204.

When the robot arm 91 controls the product 2 to move, since the 3D surface 204 has a certain arc, it is necessary to ensure that the normal tangent of the arc surface is perpendicular to the camera device 20 when each checking area is checked.

As illustrated in FIG. 5, the electronic device 1 further includes an analysis device 92 and a display device 93. In at least one embodiment, the analysis device 92 can be a processor, and the display device 93 can be a display screen.

The analysis device 92 analyzes images captured by the camera device 20 by an appearance defect neural network algorithm, so as to determine whether the defects such as abnormal colors, stair slope errors, scratches, and sanding marks exist on the side surface 202. The display device 93 displays a result of analysis made by the analysis device 92.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device for optically checking an appearance of a product for defects comprising:
   a camera device perpendicular to a side surface of the product to be checked, wherein a distance between the camera device and the side surface is H1;
   at least one white light source, wherein a distance between the white light source and the side surface is H2, and an angle between the white light source and the side surface is θ1; and
   at least one red light source, wherein a distance between the red light source and the side surface is H3, and an angle between the red light source and the side surface is θ2,
   wherein when the white light source is activated, the camera device captures images of the side surface and corners of the side surface of the product, when the red light source is activated, the camera device captures images of the side surface of the product, the electronic device checks appearance defects of the side surface of the product according to the images captured by the camera device, the appearance defects comprises abnormal colors, stair slope errors, scratches, and sanding marks,
   wherein a first preset distance $H1=x*[(a+b)/2]$, a second preset distance $H2=y*[(a+b)/2]$, a third preset distance $H3=z*[(a+b)/2]$, a is a length of the product, b is a width of the product, $1.3<x<1.6$, $0.3<y<0.6$, $0.6<z<0.8$, $30°<θ1<70°$, $20°<θ2<60°$.

2. The electronic device according to claim 1, further comprising:
   a bracket;
   a camera bracket; and
   a light source bracket; wherein the camera bracket and the light source bracket are arranged on the bracket, the camera device is arranged on the camera bracket, the white light source and the red light source are arranged on the light source bracket.

3. The electronic device according to claim 2, further comprising:
   a camera adjustment bracket arranged on the bracket and connected to the camera bracket, wherein the camera adjustment bracket adjusts a position of the camera device and keeps the distance between the camera and the side surface at the first preset distance.

4. The electronic device according to claim 3, wherein the camera bracket comprises a fixing portion and a fine adjustment portion, the fixing portion fixes the camera device, and the fine adjustment portion precisely adjusts the position of the camera device and keeps the distance between the camera and the side surface at the first preset distance.

5. The electronic device according to claim 3, wherein the bracket comprises two slide rails, the camera adjusting bracket comprises a first sliding portion, a first locking portion, and a connection portion, ends of the first sliding portion are sleeved on the slide rail, and one end is engaged with the first locking portion, the first locking portion locks the first sliding portion, the connection portion is connected to the first sliding portion and the camera bracket, when the first locking portion is rotated by an external force, the first sliding portion is driven by the first locking portion to slide up and down along the slide rail, the position of the camera device is thus adjusted.

6. The electronic device according to claim 5, further comprising:
a light source adjusting bracket arranged on the bracket and connected to the light source bracket, wherein the light source adjustment bracket adjusts a position of the white light source, and keeps the distance between the white light source and the side surface at the second preset distance and the angle between the white light source and the side surface at the first preset angle, the light source adjustment bracket further adjusts a position of the red light source, and keeps the distance between the red light source and the side surface at the third preset distance and the angle between the red light source and the side surface at the secondt preset angle.

7. The electronic device according to claim 6, wherein the light source adjusting bracket comprises a second sliding portion and a second locking portion, ends of the second sliding portion are sleeved on the slide rail, and one end is engaged with the second locking portion, the light source bracket comprises two supporting portions arranged on the second sliding portion, the white light source is arranged on one of the supporting portions, the red light source is arranged between the two supporting portions, when the second locking portion is driven to rotated by an external force, the second sliding portion is driven by the second locking portion to slide up and down along the slide rail, positions of the white light source and the red light source are thus adjusted.

8. The electronic device according to claim 1, further comprising:
a robot arm for controlling each of the side surfaces and the corners of the product to enter a capturing range of the camera device, by moving and rotating the product.

9. The electronic device according to claim 1, further comprising:
an analysis device analyzing the images captured by the camera device through an appearance defect neural network algorithm, and determining whether the abnormal colors, the stair slope errors, scratches, or the sanding marks exists on the side surface of the product; and
a display device displaying a result of analysis made by the analysis device.

10. The electronic device according to claim 1, wherein the camera device is an industrial camera with five-megapixel, and has a fixed-focus industrial lens with a focal length range of 15-17 mm, a range of exposure time of the camera device is 4400-4800 μs.

11. The electronic device according to claim 1, wherein the white light source and the red light source are bar-shaped light sources, and extension directions of the white light source and the red light source are in parallel with the side surface of the product, a brightness range of the white light source and the red light source is 6500-7600 lm.

* * * * *